United States Patent [19]

Ogawa et al.

[11] 4,347,409
[45] Aug. 31, 1982

[54] KEY TELEPHONE SYSTEM

[75] Inventors: Seiki Ogawa, Tokyo; Michio Mito; Tsuyoshi Shinoi, both of Kawasaki, all of Japan

[73] Assignees: Nippon Telegraph and Telephone Public Corporation, Tokyo; Nippon Tsushin Kogyo Kabushiki Kaisha, Kawasaki, both of Japan

[21] Appl. No.: 178,950

[22] Filed: Aug. 18, 1980

[30] Foreign Application Priority Data

Aug. 20, 1979 [JP] Japan .............................. 54/104921
Aug. 20, 1979 [JP] Japan .......................... 54/113353[U]
Aug. 20, 1979 [JP] Japan .......................... 54/113354[U]

[51] Int. Cl.³ .............................................. H04Q 5/20
[52] U.S. Cl. .................................... 179/99 P; 179/99 R
[58] Field of Search ............... 179/99 P, 99 M, 99 R, 179/18 FA, 18 GE, 18 GF, 81 B

[56] References Cited

U.S. PATENT DOCUMENTS

| | | | |
|---|---|---|---|
| 4,160,131 | 7/1979 | Kaul et al. | 179/99 M |
| 4,184,054 | 1/1980 | Shibata et al. | 179/99 M |
| 4,203,011 | 5/1980 | Coviello | 179/99 P |
| 4,236,049 | 11/1980 | Tanihata et al. | 179/99 P |

Primary Examiner—Gerald L. Brigance
Attorney, Agent, or Firm—Burns, Doane, Swecker & Mathis

[57] ABSTRACT

A key telephone system comprises a main equipment connected to at least one set of central office (CO) lines and capable of connecting thereto a plurality of key telephones. The main equipment includes a dual tone multifrequency (DTMF) sending circuit common to the key telephones, and the respective key telephones are connected to the main equipment through six wiring cables forming a pair of two-way voice frequency talking circuits and one two-way data transmitting circuit. A plurality of switching matrixes are included in the main equipment for selectively connecting the CO lines and the talking circuits, and also connecting the data transmitting circuit through the DTMF sending circuit to the CO lines and one of the talking circuits in the key telephone, whereby respective functions of hand-free talk-back and off-hook signalling during intercom talking, and speaker monitoring function during CO line talking are performable.

6 Claims, 7 Drawing Figures

KEY TELEPHONE SYSTEM

BACKGROUND OF THE INVENTION

1. Field of the Invention:

This invention relates to key telephone systems and, more particularly, to a key telephone system capable of operating in modes such as hand-free talk-back, off-hook signaling and the like with a less number of wiring cables between a main equipment and respective key telephones.

What the present invention further relates to is more specifically, a key telephone system wherein the number of wiring cables between the main equipment and each key telephone is reduced to six, with which two sets of two-way voice frequency talking paths, one set of two-way digital data transmitting paths and electric power supplying paths from the main equipment to the respective key telephones are formed. The invention also pertains to a key telephone system wherein a plurality of key telephones are provided with two sets of voice frequency talking circuits connected respectively to the two sets of two-way voice frequency talking paths, and the main equipment is provided with a key telephone interface circuit corresponding to each of the key telephones and connected to the two sets of the two-way voice frequency talking paths. The main equipment also includes a plurality of switching matrixes connecting the key telephone interface circuit to an interface circuit of central office lines (which shall be referred to as CO lines hereinafter), an intercom trunk and audible signal source, and a further plurality of switching matrixes connecting the CO line interface circuit to an audible signal source and a circuit for sending dual-tone multifrequency signals (which shall be referred to as DTMF signals hereinafter). The invention further relates to a key telephone system wherein the DTMF signal generating circuit is eliminated from each of the plurality of key telephones and the dial digit signal of each key telephone is transmitted to the main equipment to be converted to a DTMF signal by using a DTMF signal of a DTMF sending circuit in the main equipment and then sent to the CO lines (subscriber's lines) through the CO line interface circuit.

2. Description of Prior Art:

In conventional key telephone systems in which the number of wiring cables between the key telephone and the main equipment is six, two of the wiring cables are used as a voice frequency talking path, another two are used as digital data transmitting paths from the main equipment to the key telephone, and the remaining two are used as digital data transmitting paths from the key telephone to the main equipment. In these systems, the voice frequency talking path is single and there has been a problem in that the key telephone responding to one incoming call can not respond to another incoming call requirement.

It has become increasingly necessary, therefore, to solve such problem, by means of, for example, an off-hook signaling function provided to the key telephone for responding to another incoming call requirement with a speaker and microphone arranged in the key telephone during use of an ordinary handset so as to immediately deal with congested talking requirements, that is, to provide a key telephone system of a high efficiency capable of responding to as many incoming call requirements as possible without blocking an ongoing conversation. In order to respond to this requisite, two further wiring cables have been additionally arranged between the key telephone and the main equipment so as to form a second voice frequency talking path. In this case, however, there have been still involved such problems that, as the number of the wiring cables increases, it is necessary to secure spaces for housing the increased number of cables in the main equipment and key telephone, required wiring work becomes complicated and, as a result, it is difficult to save required materials and to lower the costs. Further, due to the additional arrangement of a limited number of the wiring cables, the requisite of increasing the talking efficiency has not been well satisfied. The present invention has been suggested in view of these problems.

A primary object of the present invention is, therefore, to provide a novel key telephone system wherein the number of wiring cables is maintained at six, wherein two of the two-way voice frequency talking paths are formed of four of the six wiring cables, a two-way digital data transmitting path is formed of the remaining two of the wiring cables, and the two wiring cables forming one of the two talking paths and the two wiring cables forming the data transmitting path are respectively utilized as phantom lines to form electric power supplying paths.

Another object of the present invention is to provide a key telephone system provided with a plurality of switching matrixes for utilizing two of the two-way voice frequency talking paths to implement the functions of handset talking, speaker talking, intercom hand-free talking, off-hook signaling and tone signaling.

A further object of the present invention is to provide a key telephone system wherein the two-way digital data transmitting paths are efficiently utilized so as to eliminate the costly tone generating circuit from the DTMF signal generating dial circuit of the key telephone.

Yet another object of the present invention is to provide a key telephone system provided with a plurality of matrixes connecting a pair of two-way voice frequency circuits and a further plurality of switching matrixes connecting a two-way digital data transmitting path to such signal source as a DTMF sending circuit or the like so as to remarkably improve the respective functions of the key telephone at low manufacturing costs.

SUMMARY OF THE INVENTION

In order to achieve the respective objects, the present invention suggests in its various aspects such arrangements of the key telephone system that:

The system comprises a reduced number of wiring cables arranged between a main equipment and a plurality of key telephones, a plurality of switching matrixes arranged within the main equipment so as to connect the wiring cables and a DTMF sending circuit arranged within the main equipment so as to send DTMF signals to the central office in response to a command from each key telephone.

In the key telephone system, the number of wiring cables between the main equipment and the respective key telephones is six, wherein a pair of two-way voice frequency talking paths are formed of four of these wiring cables, a two-way digital data transmitting path is formed of the remaining two of the wiring cables, and two of the four wiring cables forming one of the two-way voice frequency talking paths and the two wiring cables forming the two-way digital data transmitting path are utilized as phantom lines so as to form electric power supplying paths.

In another arrangement of the key telephone system, the main equipment further comprises (a) two-way and one-step switching matrixes which connect one of the voice frequency circuits of a key telephone interface circuit in the main equipment that is connected to one of the voice frequency circuits in a key telephone, through one of the two-way voice frequency talking paths, to any one of the CO line interface circuits changeably as required or any one of the intercom trunk circuits, (b) two-way and one-step switching matrixes which connect, in connecting another key telephone to the key telephone through an intercom trunk, the particular intercom trunk circuit to a plurality of tone sources changeably as required, (c) four-line switching matrixes which connect the four-line side of a two-line-to-four-line converting circuit in the other voice frequency circuit of the key telephone interface circuit in the main equipment, that is connected to the other voice frequency circuits in the key telephone through the other two-way voice frequency talking path, to the four-line side of any one of the intercom trunk circuit changeably as required, (d) a switch array for changeably connecting one of the voice frequency talking paths to an incoming talking path in the other voice frequency talking path that is separated by a two-line-to-four-line converting circuit, that is, the talking path sending voice signals to the key telephone from the main equipment, and (e) one-step connected switching matrixes which, when the key telephone siezes a CO line (subscriber's line) and sends DTMF signals to the central office through the main equipment, connect any one of DTMF sending circuits changeably as required to any one of the CO line interface circuits.

Further suggested is a key telephone system which comprises a plurality of key telephones and a main equipment, wherein the key telephones respectively comprise a push button pad from which a DTMF signal generating circuit is eliminated, a controlling circuit which periodically scans respective contacts of push buttons in the pad through a scanning circuit, a storing circuit which stores such data as numerical values corresponding to the contacts closed by the depressed push buttons, and a data transmitting and receiving circuit which reads the stored contents of the storing circuit as digital data through the controlling circuit to send this data to the key telephone interface circuit of the main equipment and provides the digital data received from the key telephone interface circuit to the controlling circuit to light a proper indicating lamp. The main equipment comprises a digital data transmitting and receiving circuit arranged in the key telephone interface circuit and connected to the digital data transmitting and receiving circuit of the key telephone, a main controlling section which transmits and receives digital data to and from the key telephone through the digital data transmitting and receiving circuit of the key telephone interface circuit so as to drive a plurality of switching matrixes in response to the digital data obtained from the key telephone, a storing circuit which stores the digital data received by the main controlling section, and a DTMF sending circuit which converts one part of the digital data stored in the storing circuit into DTMF signals and sends the converted signals to the CO lines (subscriber's cables) through the switching matrixes.

In a further aspect of the key telephone system, two voice frequency circuits and one digital data transmitting and receiving circuit are arranged in each key telephone, which are connected respectively to two voice frequency circuits and a digital data transmitting and receiving circuit in the key telephone interface circuit of the main equipment through two wiring cables to thereby form a pair of two-way voice frequency talking paths, a two-way digital data transmitting path and an electric power supplying path between the key telephone and the main equipment. In addition to ordinary connections to the CO line, intercom connections and tone connections, an off-hook signaling can be provided utilizing a highly flexible switching matrix, so as to respond hand-free to an intercom terminating call arriving during a conversation.

In a still further aspect of the key telephone system, the DTMF sending circuit for each key telephone is eliminated, whereas a common DTMF sending circuit is arranged only in the main equipment, a DTMF signal is sent to the CO line through a switching matrix from the common DTMF sending circuit only when required and, therefore, the manufacturing costs are extremely low.

Yet further suggested is a key telephone system wherein the operating state of the push button pad of each key telephone is transmitted as digital data to the main controlling section of the main equipment and, therefore, a restriction of toll call connections of the key telephone and digital signal sending operation of the finally depressed push button can be realized by a very economical means.

BRIEF DESCRIPTION OF THE DRAWINGS

The present invention as well as its other objects and advantages shall be made more clear by reference to the following description detailed with reference to preferred embodiments as shown in accompanying drawings, in which.

While the invention shall now be explained hereinafter with reference to the embodiment shown in the drawings, the intention is not to limit the invention to the particular embodiment but is to rather include all possible modifications, alterations and equivalent arrangements within the scope of the appended claims.

DESCRIPTION OF THE INVENTION

Figure 1:
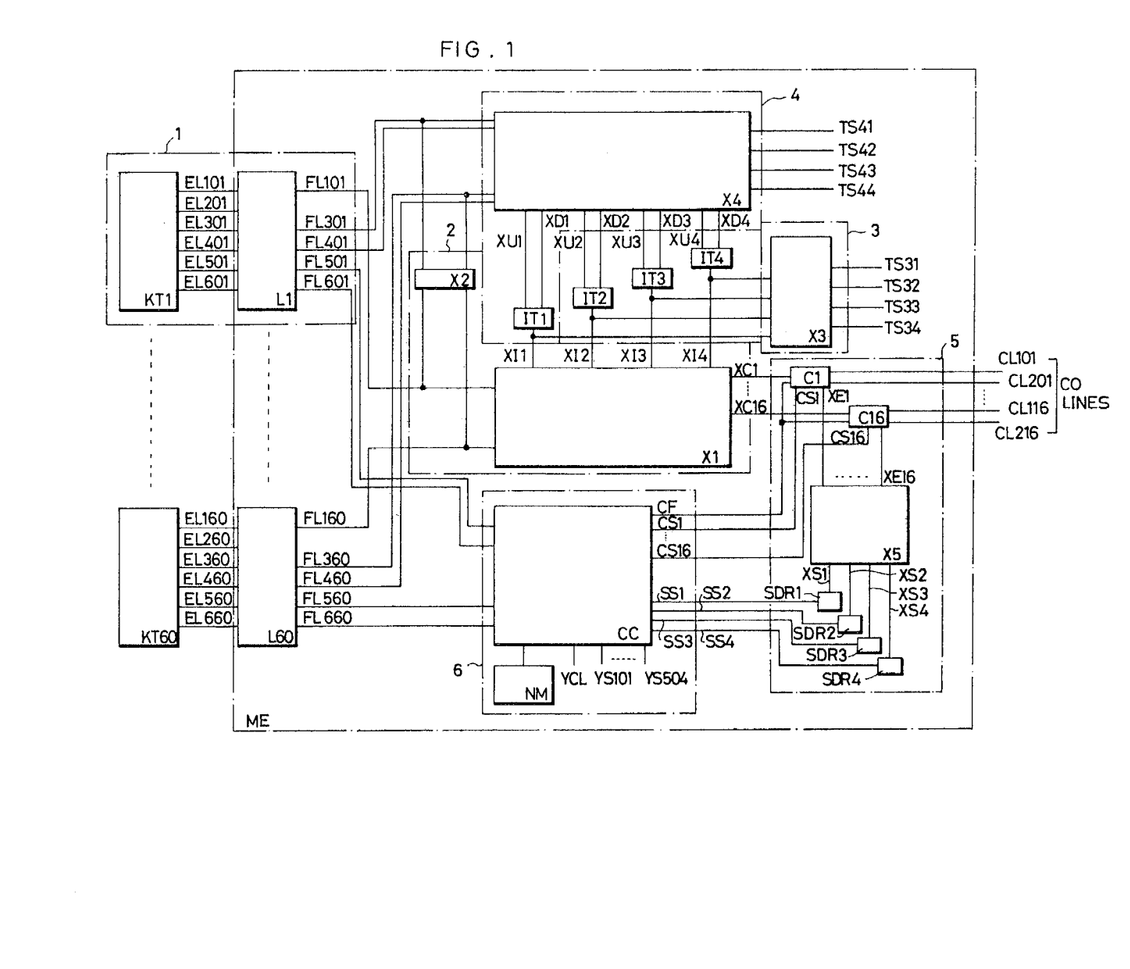
FIG. 1 is a block diagram of a key telephone system of the present invention provided with a main equipment ME connected to CO lines (subscriber's lines) and key telephones KT1 to KT60 connected respectively to each of key telephone interface circuits L1 to L60 arranged in the main equipment ME.

Referring now to FIG. 1, the main equipment ME of the key telephone system according to the present invention, which is adapted, for example, to sixty key telephones denoted by KT1 to KT60, is provided with sixty key telephone interface circuits L1 to L60 which are respectively connected to each of the key telephones through six wiring cables EL101-EL601 to EL160-EL660. In the drawing, only the first key telephone interface circuit L1 and first key telephone KT1 connected with each other through the wiring cables EL101, EL201, EL301, EL401, EL501 and EL601 and the sixtieth key telephone interface circuit L60 and sixtieth key telephone KT60 connected with each other through the wiring cables EL160, EL260, EL360, EL460, EL560 and EL660 are illustrated to avoid a complication of the drawing. Similarly, the connections between the respective key telephone interface circuits L1 to L60 and the other circuits in the main equipment ME are also shown only by lead wires FL101, FL301, FL401, FL501 and FL601 between the first key telephone interface circuit L1 and the respective other circuits and lead wires FL160, FL360, FL460, FL560 and FL660 between the sixtieth key telephone interface circuit L60 and the respective other circuits, so as to avoid any further complication of the drawing. The first key telephone interface circuit L1 is connected through the lead wire FL101 to the switching matrix X1 and switch array X2, through the lead wire FL301 to the switch array X2 and switching matrix X4, through the lead wire FL401 to the switching matrix X4 and through the lead wires FL501 and FL601 to the main controlling circuit CC. Similarly, the sixtieth key telephone interface circuit L60 is connected through the lead wires FL160 to the switching matrix X1 and switch array X2, through the lead wire FL360 to the switch array X2 and switching matrix X4, through the lead wire FL460 to the switching matrix X4 and through the lead wires FL560 and FL660 to the main controlling circuit CC. It will be clear that the other key telephone interface circuits L2 to L59 are respectively connected in the same manner as above. The switching matrix X1 is connected to the intercom trunk circuits IT1 to IT4 respectively through lead wires XI1 to XI4 and to the switching matrix X3 also through these lead wires XI1 to XI4. The switching matrix X4 is connected through lead wires TS41 to TS44 to the tone source to which the switching matrix X3 is connected through lead wires TS31 to TS34, and to the intercom trunk circuits IT1 to IT4 respectively through four pairs of lead wires XU1 and XD1, XU2 and XD2, XU3 and XD3 and XU4 and XD4. The CO line interface circuits C1 to C16 connected to the switching matrix X1 respectively through lead wires XC1 to XC16 are connected respectively to CO lines CL101 and CL201 to CL116 and CL216. The switching matrix X5 connected to the CO line interface circuits C1 to C16 respectively through lead wires XE1 to XE16 is connected to the DTMF sending circuits SDR1 to SDR4 respectively through lead wires XS1 to XS4. The main controlling circuit CC connected to the respective CO line interface circuits C1 to C16 through a lead wire CF is further connected to the CO line interface circuits C1 to C16 respectively through further lead wires CS1 to CS16, to the DTMF sending circuits SDR1 to SDR4 through lead wires SS1 to SS4 and to the respective switching matrixes X1, X3 to X5 and switch array X2 through a lead wire YCL. In addition, the main controlling circuit CC is connected to the switching matrix X1 through lead wires YS101 to YS175, to the switching array X2 through lead wires YS201 to YS215, to the switching matrix X3 through a lead wire YS301, to the switching matrix X4 through lead wires YS401 to YS431 and to the switching matrix X5 through lead wires YS501 to YS504. Further, the numerical value memory circuit NM is connected to the main controlling circuit CC through a lead wire.

Figure 2:
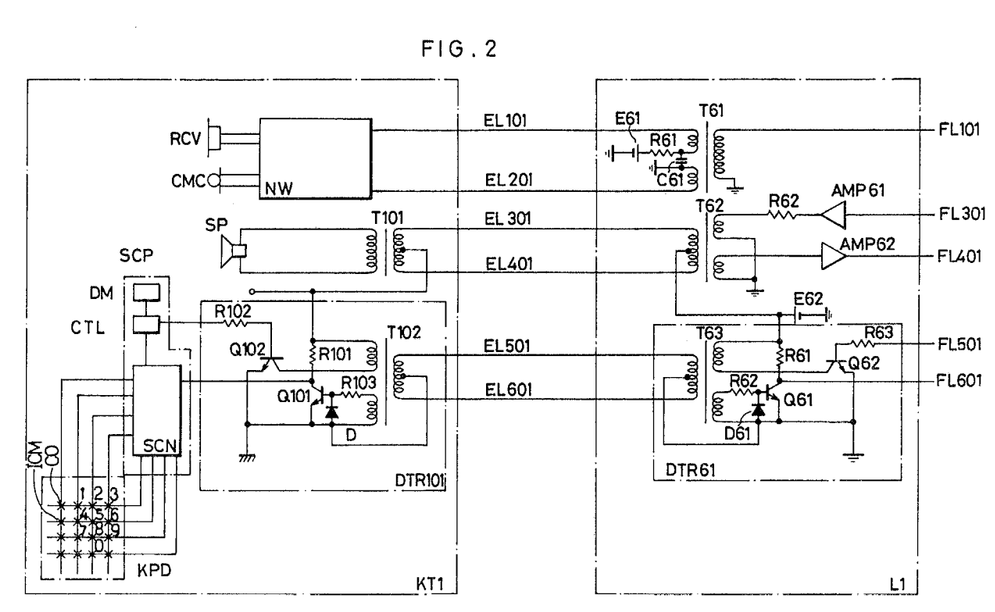
FIG. 2 shows a practical circuit arrangement of a part of the system encircled by a chain line 1 in FIG. 1, in particular, the key telephone KT1 and its corresponding key telephone interface circuit L1 in the main equipment ME, relatively in detail.

The key telephone system of the present invention shall now be explained in detail with reference to FIGS. 2 to 7. Referring to FIG. 2 showing more specifically, as an example, the first key telephone interface circuit L1 of the main device ME and key telephone KT1 connected with each other through the six wiring cables EL101, EL201, EL301, EL401, EL501 and EL601, transmitter CMC and receiver RCV of the handset of the key telephone KT1 are connected to a hybrid circuit NW which is connected to one end of each of a pair of primary windings of a transformer T61 in the key telephone interface circuit L1 through the wiring cables EL101 and EL201 which are thus forming one of a pair of two-way voice frequency talking paths. A series circuit of a resistance R61 and direct current source E61 grounded at the negative pole is inserted between the other ends of the two primary windings of the transformer T61, and a capacitor C61 is inserted in parallel with this series circuit. The secondary winding of the transformer T61 is connected at one end of the switching matrix X1 and switch array X2 through the lead wire FL101 and is grounded at the other end. A load speaker SP of the key telephone KT1 is connected to the primary winding of a transformer T101, while the secondary winding of this transformer T101 is connected at both ends to both ends of the primary winding of a transformer T62 in the key telephone interface circuit L1 respectively through the wiring cables EL301 and EL401 which are thus forming the other one of the two-way voice frequency talking paths. One of the secondary windings of the transformer T62 is connected at one end to the lead wire FL301 through a resistance R62 and reverse directional amplifier AMP61 and is grounded at the other end, while the other secondary winding of the transformer T62 is connected at one end to the lead wire FL401 through a normal directional amplifier AMP62 and is grounded at the other end. Further, an intermediate tap of the primary winding of the transformer T62 is grounded through a direct current source E62. In a push button pad KPD of the key telephone KT1, columns and rows which form respective cross-points corresponding to push buttons denoted by references 0 through 9, CO, ICM and the like are connected to a scanning circuit SCN of a controlling processor SCP. The scanning circuit SCN is connected to a dial memory circuit DM through a controlling circuit CTL. The circuits SCN, DM and CTL are hardware included in the processor SCP. One of the primary windings of a transformer T102 of a data transmitting and receiving circuit DTR101 in the key telephone KT1 is connected at one end to the intermediate tap of the secondary winding of the transformer T101, grounded through a series circuit of a resistance R101 and transistor Q101 and grounded at the other end through a transistor Q102 which is connected at the base to the controlling circuit CTL in the controlling processor SCP through a resistance R102. The other primary winding of the transformer T102 is connected at one end to the base of the transistor Q101 through a resistance R103, grounded at the other end and connected also at the other end to the base of the transistor Q101 through a normal directional diode D101. The secondary winding of this transformer T102 is connected at its intermediate tap to the other end of the other primary winding of the transformer T102 and at both ends to both ends of the primary winding of a transformer T63 of a data transmitting and receiving circuit DTR61 in the key telephone interface circuit L1 through the wiring cables EL501 and EL601. One of the secondary windings of this transformer T63 is connected at one end to an intermediate tap of the transformer T62 and grounded through a series circuit of a resistance R61 and transistor Q61 and is further connected at the same one end to an intermediate tap of the primary winding of the same transformer T63. The other end of this secondary winding is grounded through a transistor Q62. The other secondary winding of this transformer T63 is connected at one end to the base of the transistor Q61 through a resistance R62 and is grounded at the other end, which is also connected to the base of the transistor Q61 through a normal directional diode D61. The junction point between the transistor Q61 and the resistance R61 is connected to the lead wire FL601, whereas the base of the transistor Q62 is connected to the lead wire FL501 through a resistance R63.

Figure 3:
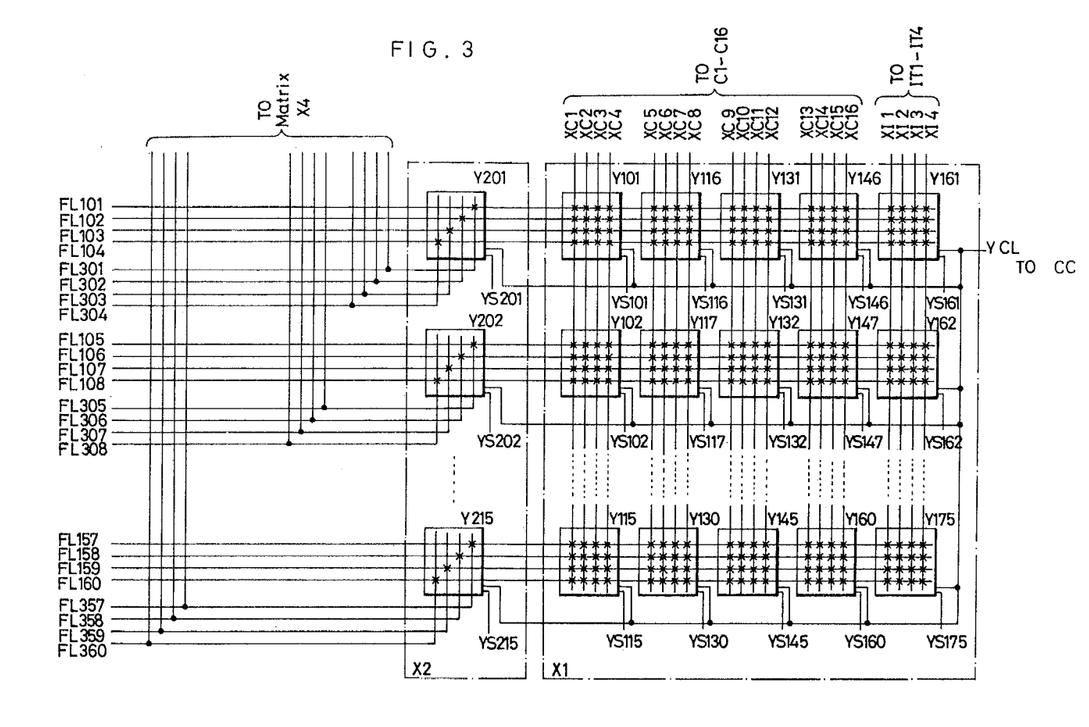
FIG. 3 shows a practical circuit arrangement of a part of the system encircled by a chain line 2 in FIG. 1, in particular, a switching matrix X1 connected to the respective key telephone interface circuits L1 to L60, to the CO lines through respective CO line interface circuits C1 to C16 and further to respective intercom trunk circuits IT1 to IT4, and a switch array X2 connected to the respective key telephone interface circuits L1 to L60.

As shown in FIG. 3, the switching matrix X1 comprises 75 pieces of cross-point switches Y101 to Y175 each of which is of 4 columns and 4 rows. Referring to their wirings with a representation i=01 to 15, the respective rows in each of the respective groups of the cross-point switches Y1i, Y1(i+15), Y1(i+30), Y1-(i+45) and Y1(i+60) are connected to each of the lead wires FL1(4i−3), FL1(4i−2), FL1(4i−1) and FL1(4i), whereas the respective columns in each of the respective groups of the cross-point switches Y101 to Y115, Y116 to Y130, Y131 to Y145, Y146 to Y160 and Y161 to Y175 are connected respectively to each of the lead wires XC1 to XC4, XC5 to XC8, XC9 to XC12, XC13 to XC16 and XI1 to XI4. All of the cross-point switches Y101 to Y175 are connected to the lead wire YCL and to the respective lead wires YS101 to YS175. The switch array X2 is formed of fifteen cross-point switches Y201 to Y215 each of which is of 4 columns and 4 rows. Also with the representation i=01 to 15, the rows in each of these cross-point switches Y2i are respectively connected to each of the lead wires FL1(4i−3), FL1(4i−2), FL1(4i−1) and FL1(4i) and the columns are connected respectively to each of the lead wires FL3(4i−3), FL3(4i−2), FL3(4i−1) and FL3(4i). These cross-point switches Y201 to Y215 are connected to the lead wire YCL and respectively to each of the lead wires YS201 to YS215.

Figure 4:
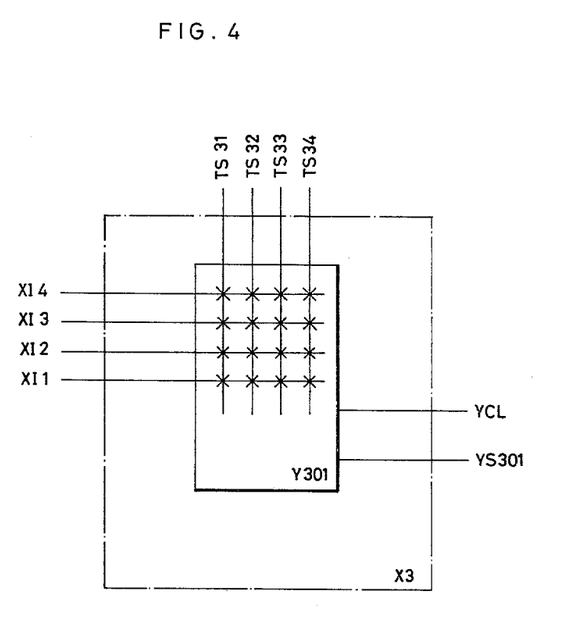
FIG. 4 shows a practical circuit arrangement of a part of the system encircled in a chain line 3 in FIG. 1, specifically a switching matrix X3 connected to the switching matrix X1 of FIG. 3 and to respective tone sources, that is, audible signal generating sources TS1 to TS4 (not shown)

Referring next to FIG. 4 showing the switching matrix X3, its cross-point switch Y301 in 4 columns and 4 rows is connected at the rows to the lead wires XI1 to XI4 and at the columns to the lead wires TS31 to TS34. The cross-point switch Y301 is further connected to the lead wires YCL and YS301.

Figure 5:
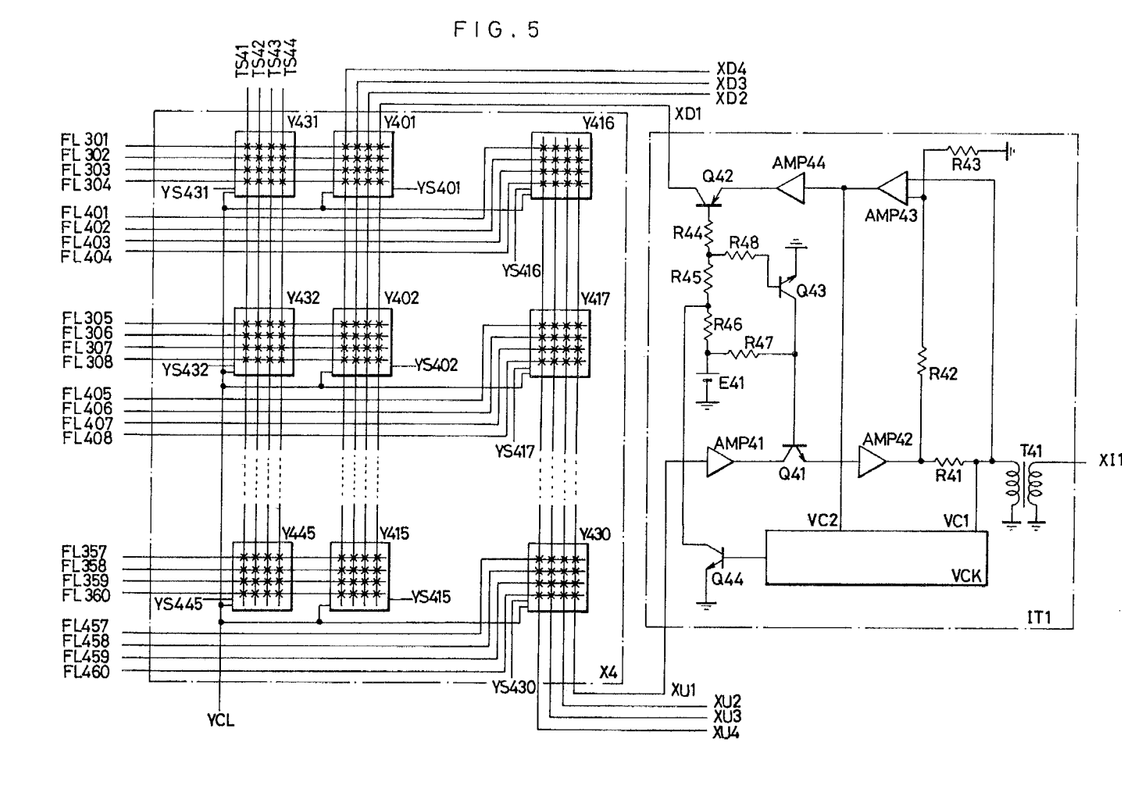
FIG. 5 shows a practical circuit arrangement of a part of the system encircled in a chain line 4 in FIG. 1, in particular, a switching matrix X4 connected to the key telephone interface circuits L1 to L60 and tone sources TS1 to TS4, and the intercom trunk circuits IT1 to IT4 to which the matrix X4 is also connected, wherein only one circuit IT1 is shown since the others IT2 to IT4 are of the same arrangement.

As shown in FIG. 5, the switching matrix X4 comprises 45 cross-point switches Y401 to Y445 respectively of 4 columns and 4 rows. With the same representation i=01 to 15, the rows of the cross-point switches Y4i and Y4(i+30) are connected respectively to each of the lead wires FL3(4i−3), FL3(4i−2), FL3(4i−1) and FL3(4i), while the columns of the cross-point switches Y401 to Y415 are connected to the lead wires XD1 to XD4 and the columns of the cross-point switches Y431 to Y445 are connected to the lead wires TS41 to TS44. Further cross-point switches Y4(i+15) are connected at their rows respectively to each of the lead wires FL4(4i−3), FL4(4i−2), FL4(4i−1) and FL4(4i) and at their columns respectively to each of the lead wires XU1 to XU4. The cross point switches Y401 to Y445 are further connected to the lead wire YCL and respectively to the lead wires YS401 to YS445.

An amplifier AMP41 which is a component element of the intercom trunk circuit IT1 is connected at the input end to the lead wire XU1 and at the output end through a series circuit of a transistor Q41, amplifier AMP42 and resistance R41 to an end of the primary winding grounded at the other end of a transformer T41. The secondary winding of this transformer T41 is connected at one end to the lead wire XI1 and grounded at the other end. An amplifier AMP43 is connected at an inverted input end to the said one end of the primary winding of the transformer 41 and at a non-inverted input end to the output end of the amplifier AMP42 through a resistance R42, and this non-inverted input end is grounded through a resistance R43. Further, the amplifier AMP43 is connected at the output end to the lead wire XD1 through an amplifier AMP44 and transistor Q42, the base of which is grounded through resistances R44 to R46 and a direct current source E41. A transistor Q43 grounds the base of the transistor Q41 which is also grounded through a series circuit of a resistance R47 and the direct current source E41. The base of the transistor Q43 is connected to the junction of the resistances R44 and R45 through a resistance R48. A further transistor Q44 grounds the junction of the resistance R45 and R46. A controlling circuit VCK connected at the output end to the base of the transistor Q44 is connected at one input end to the said one end of the primary winding of the transformer T41 through a lead wire VC1 and at the other input end to the output end of the amplifier AMP43 through a lead wire VC2. While not shown in the drawing, the other intercom trunk circuits IT2 to IT4 are also formed in the same manner as the intercom trunk circuit IT1.

Figure 6:
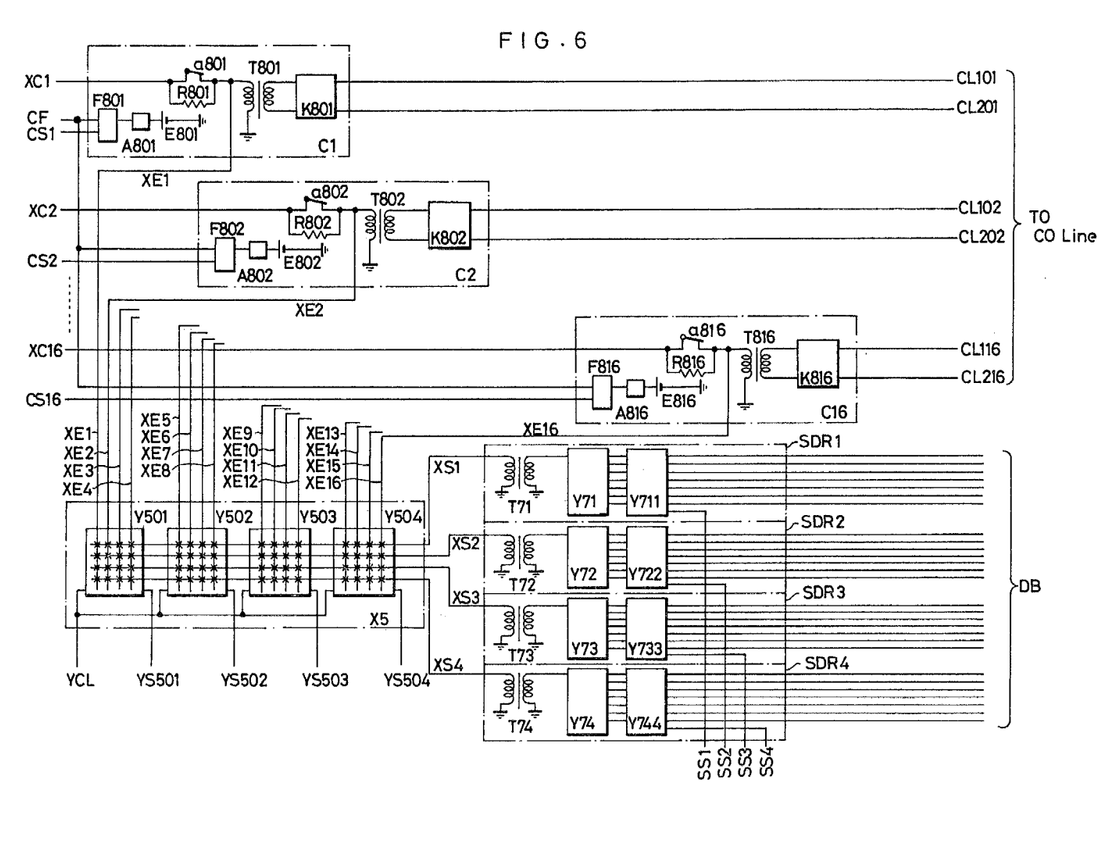
FIG. 6 is a practical circuit arrangement of a part shown by a chain line 5 in FIG. 1, specifically of the CO line interface circuits C1 to C16, a switching matrix X5 connected to these interface circuits C1 to C16 and DTMF sending circuits SDR1 to SDR4 connected to the matrix X5.

Referring next to FIG. 6, the switching matrix X5 comprise four cross-point switches Y501 to Y504 which are respectively of 4 columns and 4 rows. The rows of all of these corss-point switches Y501 to Y504 are connected to the lead wires XS1 to XS4 whereas, with a representation i=01 to 04 the columns of these respective cross-point switches Y5i are connected respectively to each of the lead wires XE(4i−3), XE(4i−2), XE(4i−1) and XE4i. In the respective CO line interface circuits Cj, with a representation j=01 to 16, the primary winding of a transformer T8j is grounded at one end and connected at the other end to the lead wire XEj. This transformer T8j is connected at the other end also to the lead wire XCj through a parallel circuit of a relay contact a8j and resistance R8j. A relay A8j which opens and closes the relay contact a8j is grounded at one end through a direct current source E8j and connected at the other end to the output end of a flip-flop F8j which is connected at the respective input ends to the lead wires CF and CSj. A functional circuit K8j is connected to the secondary winding of the transformer T8j and to the CO lines CL1j and CL2j. In the DTMF sending circuits SDRi (i=1 to 4), the primary winding of a transformer T7i is grounded at one end and connected at the other end to the lead wire XSi, and the secondary winding of the transformer T7i is grounded at one end and connected at the other end to the output end of a DTMF signal oscillating circuit Y7i which provides DTMF signals consisting of two tones. This DTMF signal oscillating circuit Y7i is connected to a one-digit memory circuit Y7ii which is connected to the lead wire SSi and further to data bus lines DB.

Figure 7:
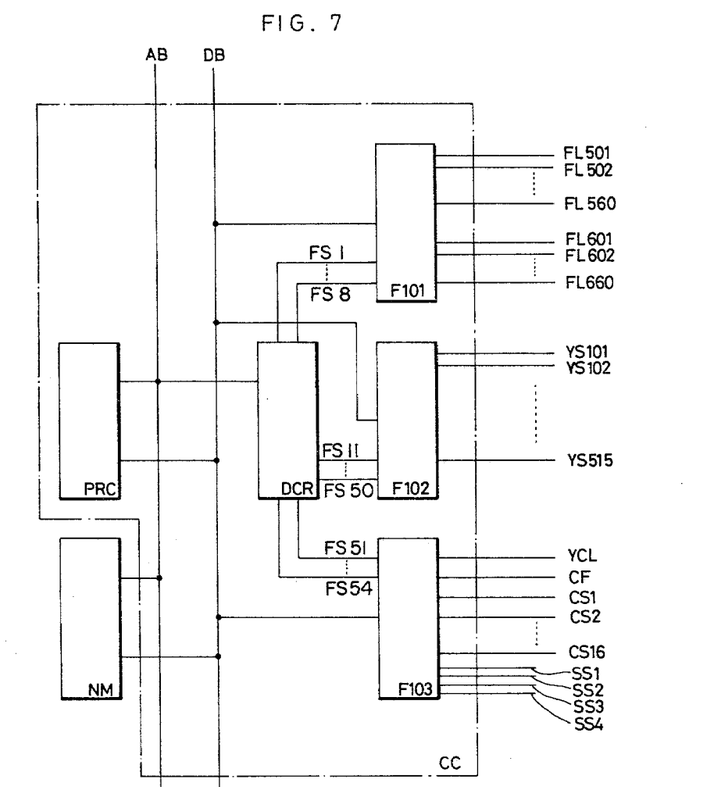
FIG. 7 is of a practical circuit arrangement of a part shown by a chain line 6 in FIG. 1, specifically of a main controlling circuit CC connected to the respective key telephone interface circuits L1 to L60, switching matrixes X1, X3 to X5, switch array X2, CO line interface circuits C1 to C16 and DTMF sending circuits SDR1 to SDR4, and a numerical value memory circuit NM connected to the main controlling circuit CC.

Referring now to FIG. 7, the main controlling circuit CC includes a processor PRC which is connected to address bus lines AB and also to the data bus lines DB, to the latter of which an address decoder DCR is connected, while this decoder is connected to the lead wires FS1 to FS54. A first flip-flop group F101 connected to the data bus lines DB is also connected to the lead wires FS1 to FS8 and to the lead wires FL501 to FL560 and FL601 to FL660. A second flip-flop group F102 connected to the data bus lines DB is also connected to the lead wires FS11 to FS50 and to the lead wires YS101 to YS515. A third flip-flop group F103 connected to the data bus lines DB is also connected to the lead wires FS51 to FS54 and to the lead wires YCL, CF, CS1 to CS16 and SS1 to SS4. The numerical value memory circuit NM is connected to both the address and data bus lines AB and DB so as to operate as a means for temporarily storing the data in the processor PRC. While the main controlling device CC is further provided with a program storing circuit for storing a controlling program of the processor PRC and a timer circuit setting the time of the processor PRC, they are not directly related to the present invention and references thereto are omitted here.

The respective functions of the key telephone system of the present invention shall be described in detail hereinafter.

INTERCOM CALLING WITH HANDSET

References shall be made to an intercom call from the key telephone KT1 to the key telephone KT60, as an example.

When the handset of the key telephone KT1 is lifted to achieve the off-hook state (not shown), the controlling circuit CTL of the controlling processor SCP will begin to scan at a fixed period the opening and closing of the respective cross-points in the push button pad KPD through the scanning circuit SCN. The inter-extension talking button ICM of the push button pad KPD is pressed and an inter-extension call addressing signal is temporarily stored in the dial memory circuit DM through the scanning circuit SCN and controlling circuit CTL.

In the main equipment ME, the processor PRC drives the flip-flops in the first flip-flop group F101 through the address decoder DCR to deliver a seizure signal onto the lead wire FL501. In response to this signal, the transistor Q62 in the data transmitting and receiving circuit DTR61 of the key telephone interface circuit L1 is actuated and seizure pulses are provided to the wiring cables EL501 and EL601 through the transformer T63. The seizure pulses are then provided to the base of the transistor Q101 through the transformer T102 arranged in the digital data transmitting and receiving circuit DTR101 in the key telephone KT1, whereby the transistor Q101 conducts to transmit the seizure pulses to the scanning circuit SCN of the controlling processor SCP, and the inter-extension call addressing signal temporarily stored in the dial memory circuit DM is thereby sent out through the controlling circuit CTL. In response to the thus provided intercom call addressing signal, the transistor Q102 in the data transmitting and receiving circuit DTR101 is actuated to deliver the addressing signal to the wiring cables EL501 and EL601, through which the addressing signal is conveyed to the data transmitting and receiving circuit DTR61 of the key telephone interface circuit L1 in the main equipment ME, wherein the signal is fed to the base of the transistor Q61 through the transformer T63 to actuate the transistor Q61 and the inter-extension call addressing signal is provided to the further lead wire FL601.

In the main equipment ME, the flip-flops in the first flip-flop group F101 of the main controlling circuit CC receive the intercom call addressing signal through the lead wire FL601, and the signal is provided through the data bus lines DB to the processor PRC, so that the intercom call addressing signal made at the key telephone KT1 will be detected by the processor PRC and a proper signal will be sent from the processor PRC to the respective flip-flop groups F102 and F103 through the address decoder DCR. Cross-point switch selecting signals for selecting the cross-point switches Y161 and Y301 in the matrixes X1 and X3 are provided respectively to the lead wires YS161 and YS301 by the flip-flops in the flip-flop group F102, and a cross-point switch driving signal for driving all of the cross-point switches in the matrixes X1 to X5 is provided to the lead wire YCL by the flip-flops in the flip-flop group F103, whereby there is formed a series circuit of the receiver RCV of the handset of the key telephone KT1-hybird circuit NW-wiring cables EL101 and EL201-transformer T61 in the key telephone interface circuit L1 of the main equipment ME-lead wire FL101-rows of the cross-point switch Y161 in the switching matrixes X1-columns of the cross point switch Y161-lead wire XI1-rows of the cross-point switch Y301 in the switching matrix X3-columns of the cross-point switch Y301-lead wire TS31-tone source. The output signal of the tone source, that is, the dial tone is then transmitted to the receiver RCV of the handset of the key telephone KT1.

After the dial tone is heard, the push buttons "6" and "0" of the push button pad KPD are pressed in turn for the number "60" of the desired key telephone KT60 to from the intercom trunk. Upon the depressions of the push buttons "6" and "0", the number "60" is provided to the main controlling device CC in the main equipment ME in the same manner as in the foregoing. In the main controlling device CC, the processor PRC detects that the key telephone being called for by the intercom call addressing is the one numbered KT60 and provides a proper signal to the flip-flop groups F102 and F103 through the address decoder DCR. Cross-point switch selecting signals for selecting the cross-point switches Y161, Y175 and Y301 are then provided respectively to the lead wires YS161, YS175 and YS301 by the flip-flops of the flip-flop group F102 and a cross point switch driving signal for driving all of the cross-point switches is provided to the lead wire YCL by the flip-flops of the flip-flop group F103,

--- whereby there is formed a circuit of the receiver RCV of the handset of the key telephone KT1 - hybrid circuit NW - wiring cables EL101 and EL201 - transformer T61 of the key telephone interface circuit L1 in the main equipment ME - lead wire FL101 - rows of the cross-point switch Y161 in the switching matrixes X1 - columns of the cross-point switch Y161

⎡ lead wire XI1 - rows of the cross-point switch Y301 of the
⎢ switching matrix X3 - columns of the cross-point switch Y301 -
⎢ lead wire TS34 - tone source; and
⎣ columns of the cross-point switch Y175 in the switching matrixes X1 - rows of the cross-point switch Y175 - lead wire FL160 - transformer T660 of the key telephone interface circuit L60 - wiring cables EL160 and EL260 - hybrid circuit of the key telephone KT60.

---

An output signal of the tone source is provided as an incoming call signal to the key telephone KT60 and also as a calling signal, that is, a ring-back signal to the key telephone KT1. When, in response to a calling sound corresponding to the incoming call signal, the handset of the key telephone KT60 is lifted to achieve its off-hook, the controlling processor performs, in the same manner as in the foregoing, the scanning of the opening and closing of the cross-points in the push button pad of the key telephone KT60 and, in response to seizure pulses from the main equipment ME, the scanned results are sent to the main controlling device CC. In this case, the scanned results show that all the cross-points in the push button pad of the telephone KT60 are open, that is, the handset of the key telephone KT60 is lifted solely in response to the call sound. Therefore, the processor PRC of the main controlling device CC removes the cross-point switch selecting signal provided to the lead wire YS301 through the address decoder DCR and the flip-flops of the flip-flop group F102. Accordingly, the cross-point switch Y301 of the switching matrix X3 is opened so that, between the key telephones KT1 and KT60, there will be formed a circuit of the receiver RCV and transmitter CMC of the handset of the key telephone KT1-its hybrid circuit NW-wiring cables EL101 and EL201-transformer T61 of the key telephone interface circuit L1 of the main equipment ME-lead wire FL101-rows of the cross-point switch Y161 in the switching matrixes X1-columns of the cross-point switch Y161-lead wire XI1-columns of the cross-point switch Y175-rows of the cross point switch Y175-lead wire FL160-transformer T661 of the key telephone interface circuit L60-wiring cables EL160 and EL260-hybrid circuit NW of the key telephone KT60-receiver and transmitter of the handset of the key telephone KT60. As a result, between the both key telephones KT1 and KT60, an intercom call can be made by using their respective handsets.

INTERCOM CALL WITHOUT HANDSET

References shall be made next to an intercom call from the key telephone KT1 to the key telephone KT60 made without using the handset.

The handset of the key telephone KT1 is lifted and the intercom button ICM of the push button pad KPD is pressed, then the dial tone is generated by the receiver RCV of the handset in the same manner as described above, thereafter the push buttons "6" and "0" are pressed in turn for the number "60" of the key telephone KT60, and additionally the button "0" is pressed again, whereby button depression signals of "6", "0" and "0" are provided to the main controlling device CC of the main equipment ME for the key telephone KT1 in the same manner as described above and these signals are transmitted to the processor PRC through the flip-flop group F101 and data bus lines DB. In the processor PRC, it is detected that the third depression signal is an "0". In response to this detection, cross-point switch selecting signals respectively for selecting the cross-point switch Y161 in the switching matrix X1 and for selecting the cross-point switches Y415 and Y430 in the switching matrix X4 are provided, in the same manner as in the foregoing, respectively to the lead wires YS161, YS415 and YS430 through the address decoder DCR and flip-flop groups F102 and F103, and a cross-point switch driving signal for driving all of the cross-point switches is provided to the lead wire YCL,

--- whereby there is formed a circuit of the transmitter CMC and receiver RCV of the handset of the key telephone KT1 - its hybrid circuit NW - wiring cables EL101 and EL201 - transformer T61 of the key telephone interface circuit L1 of the main equipment ME - lead wire FL101 - rows of the cross-point switch Y161 in the switching matrixes X1 - colums of the cross point switch Y161 - lead wire XI1 - inter-extension talking circuit IT1

⎡ lead wire XD1 - columns of the cross-point switch Y415 in the
⎢ switching matrixes X4 - rows of the cross-point switch
⎢ Y415 - lead wire FL360
⎣ lead wire XU1 - columns of
   cross-point switch Y430
   in the switching matrixes
   X4 - rows of the
   cross-point switch Y430 - lead wire FL460 - amplifiers AMP661 and AMP662 of the key telephone interface circuit L60 - transformer T662 in the circuit L60 - wiring cables EL360 and EL460 - transformer T601 in the key telephone KT60 - speaker of the key telephone KT60.

---

Finally, the call using the handset from the key telephone KT1 can be responded to without using the handset at the key telephone KT60.

INTERCOM CALLING WITH OFF-HOOK SIGNALING

An intercom call performed between the key telephones KT1 and KT60 upon a hand-free intercom calling requirement made from the key telephone KT1 to the key telephone KT60 during the intercom call of the key telephone KT60 being performed with, for example, the key telephone KT50 with the handset shall be explained now.

In the present instance, as will be clear from the foregoing, there is formed, between the respective key telephones KT50 and KT60, a handset intercom trunk path of, showing briefly, the key telephone KT50-wiring cables EL150 and EL250-interface circuit L50-lead wire FL150-switching matrix X1-lead wire XI4-switching matrix X1-lead wire FL160-interface circuit L60-wiring cables EL160 and EL260-key telephone KT60. Now, as the handset of the key telephone KT1 is lifted and the intercom button ICM and push buttons "6", "0" and "0" are pressed in turn, there is formed, between the two key telephones KT1 and KT60 and in addition to the handset intercom trunk path between the key telephones KT50 and KT60, a hand-free talk-back intercom trunk path of, briefly, the key telephone KT1 - wiring cables EL101 and EL201 - interface circuit L1 - lead wire FL101 - switching matrixes X1 - lead wire XI1 - intercom trunk circuit IT1 -
┌─lead wire XD1 - switching matrixes X4 - lead wire FL360─┐
└─lead wire XU1 - switching matrixes X4 - lead wire FL460─┤
└─interface circuit L60 - key telephone KT60, as will be clear from the foregoing descriptions. Therefore, while the key telephone KT60 is performing a handset intercom call with the key telephone KT50, the same key telephone KT60 can respond to an intercom calling requirement from the key telephone KT1 in the hand-free manner. It will be clear that with this function the intercom calling density can be remarkably increased and an acceleration in the processing of calls can be also promoted.

ORIGINATING CALLS TO CO LINES

References to the case of originating a call to a CO line (subscriber's line) from the key telephone KT1 shall be made next.

When the handset of the key telephone KT1 is lifted to achieve the off-hook and the push button "CO" representing an intention of the outgoing call requirement to the CO lines as well as the numerical value push buttons of, for example, "0" and "1" for selecting one CO line from CO lines 1 to 16 are depressed, the respective corresponding signals are sequentially stored in the dial memory circuit DM of the controlling processor SCP in the same manner as has been described. In response to the arrival of the seizure pulses from the main controlling device CC of the main equipment ME in the same manner as has been described, these stored signals are sequentially provided to the processor PRC through the flip-flop group F101. The processor PRC detects the outgoing call requirement to the CO lines 1, CL101 and CL202 and provides a cross-point switch selecting signal for selecting the cross-point switch Y101 in the switching matrix X1 to the lead wire YS101 through the address decoder DCR and flip-flop groups F102 and F103 and a cross-point switch driving signal for driving all of the cross-point switches to the lead wire YCL, whereby there is formed a CO line call circuit of the transmitter CMC and receiver RCV of the handset of the key telephone KT1-its hybrid circuit NW-wiring cables EL101 and EL201-transformer T61 of the key telephone interface circuit L1 of the main equipment ME-lead wire FL101-rows of the cross-point switch Y101 in the switching matrixes X1-columns of the cross-point switch Y101-lead wire XC1-CO line interface circuit C1-CO lines CL101 and CL201. Upon completion of this CO line call circuit, a dial tone from the central office (CO) can be heard at the key telephone KT1. After the dial tone is heard, the push buttons of the key telephone KT1 are depressed sequentially according to such a required number for calling the other subscriber as, for example, "2", "3", "4", "5", "6", "7" and "8", the number thus depressed is stored sequentially in the dial memory circuit DM of the controlling processor SCP. The number of digits or signs which the dial memory circuit DM can store is 16 at most, but there is a possibility that, in the course of the read-in of the digits or signs, seizure pulses reach the controlling processor SPC through the key telephone interface circuit L1 from the main controlling circuit CC of the main equipment ME. Even in such case, the read-in and read-out of the dial memory circuit DM are made by the "First-In First-Out" system so that the stored contents in the dial memory circuit DM will be transmitted in turn to the main controlling circuit CC of the main equipment ME in the same manner as has been described above without any error. In the main controlling circuit CC, the stored contents having reached the flip-flop group F101 are stored in the numerical value memory circuit NM also of the "First-In First-Out" system through the data bus lines DB. The processor PRC of the main controlling circuit CC transmits one digit of the stored contents in the numerical value memory circuit NM to, for example, the DTMF sending circuit SDR1 which is idle in all of the DTMF sending circuits SDR1 to SDR4. More specifically, the processor PRC sends a memory command signal to the lead wire SS1 through the address decoder DCR and flip-flop group F103 to have the said one digit stored in the one digit memory circuit Y711. On the other hand, the processor PRC sends a cross-point switch selecting signal for selecting the cross-point switch Y501 in the switching matrix X5 and a flip-flop selecting signal for selecting the flip-flop F801 of the CO line interface circuit C1 respectively to the lead wires YS501 and CS1 through the address decoder DCR and flip-flop groups F102 and F103, as well as a cross-point switch driving signal and flip-flop driving signal respectively to the lead wires YCL and CF, whereby the relay A801 of the CO line interface circuit C1 is operated to open the relay contact a801, and there is formed a circuit of the one digit memory circuit Y711 of the DTMF sending circuit SDR1-DTMF signal oscillating circuit Y71-transformer T71-lead wire XS1-rows of the cross-point switch Y501 in the switching matrix X5-columns of the cross-point switch Y501-lead wire XE1-transformer T801 of the CO line interface circuit C1-functional circuit K801-CO lines CL101 and CL201. Consequently, the one digit content stored in the one digit memory circuit Y711 of the DTMF sending circuit SDR1 is converted to a DTMF signal in the DTMF signal oscillating circuit Y71 and provided to the CO lines CL101 and CL201 through such circuit formed as above. Since this circuit formed is to be maintained only for about 100 m.sec., each DTMF signal is to be transmitted to the central office as a signal which presents only for about 100 m.sec. As the time of this 100 m.sec. elapses, the stored content in the one digit memory circuit Y711 of the DTMF sending circuit SDR1 is erased and the circuit SDR1 becomes idle. Such operation as has been described is repeated for the respective digits or signs, and the stored contents in the numerical value memory circuit NM of the main controlling circuit CC are all transmitted sequentially to the central office. In the central office, the well known operation will be performed to call the other required subscriber and the required talking will be made possible through the above referred external line talking circuit.

ORIGINATING CALL TO CO LINE FOR MONITOR WITH SPEAKER

References shall now be made to the case of monitor requirement with the speaker when originating a call to a CO line from the key telephone KT1.

The handset of the key telephone KT1 is lifted to achieve the off-hook, the push button "CO" indicative of the outgoing call requirement to the CO lines and the numerical value push buttons of, for example, "0" and "1" for selecting one CO line in the CO lines CL101 to CL226 are pressed and, in addition, a push button "SP" indicative of a monitor requirement with the speaker SP is pressed. An operation achieved due to the depressions of these push buttons "CO", "0" and "1" is exactly the same as that described in the foregoing and shall not be referred to here. Due to the depression of the push button "SP", the processor PRC of the main controlling circuit CC in the main equipment ME sends a crosspoint switch selecting signal for selecting the crosspoint switch Y201 in the switch array X2 to the lead wire YS201 through the address decoder DCR and flip-flop group F102 and, in response to the cross-point switch driving signal being sent at this time to the lead wire YCL through the flip-flop group F103, the cross-point switch Y201 is caused to actuate. As a result, between the key telephone KT1 and the CO lines,

--- there is formed a circuit of the transmitter CMC and receiver RCV of the handset of the key telephone KT1 - hybrid circuit NW - wiring cables EL101 and EL201 - transformer T61 of the key telephone interface circuit L1 of the main equipment ME - lead wire FL101

⎡—rows of the cross-point switch Y101 in the switching
⎢  matrix X1 - columns of the cross-point switch Y101 -
⎢  lead wire XCL - CO line interface circuit C1 - CO lines
⎣  CL101 and CL201;
  —rows of the cross-point switch Y201 of the switching
array X2 - columns of the cross-point switch Y201 - lead wire FL301 - amplifier AMP61 of the key telephone interface circuit L1 - transformer T62 of the interface circuit L1 - wiring cables EL301 and EL401 - transformer T101 of the key telephone KT1 - speaker SP.

---

Then, the push buttons of the key telephone KT1 are pressed sequentially in accordance with such a required number as, for example, "177", the processor PRC in the main controlling circuit CC of the main equipment ME converts the required number "177" into DTMF signals by the DTMF sending circuits SDR1 to SDR4 and sends these signals to the CO lines CL101 and CL201, as will be clear from the foregoing descriptions. In the central office, the other subscriber corresponding to the particular number "177" is caught. Provided the required number "177" is allotted, for example, to a local weather news service, such informations as weather forecasts are available through the speaker SP, that is, even in a state of on-hook with the handset of the key telephone KT1 placed on the hook, the informations can be monitored through the speaker SP. It is of course possible to listen to the information even by using the handset in the off-hook state. When the monitoring through the speaker SP ends, a push button instructing the end of the monitoring among the push buttons of the key telephone KT1 may be depressed.

ELECTRIC POWER FEEDING BY PHANTOM LINES

The electric power feeding to the key telephone KT1 from the key telephone interface circuit L1 in the main equipment ME shall be referred to.

As will be clear in FIG. 2, the intermediate tap of the primary winding of the transformer T62 in the key telephone interface circuit L1 is grounded through the direct current source E62, and the intermediate tap of the primary winding of the transformer T63 is directly grounded, whereas the primary winding of the transformer T62 is connected at both ends to both ends of the secondary winding of the transformer T101 of the key telephone KT1 respectively through the wiring cables EL301 and EL401 and the primary winding of the transformer T63 is connected at both ends to both ends of the secondary winding of the transformer T102 of the key telephone KT1 respectively through the wiring cables EL501 and EL601. The intermediate tap of the secondary winding of the transformer T101 is connected to respective circuits of the key telephone KT1 and the intermediate tap of the secondary winding of the transformer T102 is grounded. It will be clear from this that the electric power is fed to the key telephone KT1 from the key telephone interface circuit L1 with a circuit of the direct current source E62 of the key telephone interface circuit L1→primary winding of the transformer T62→wiring cables EL301 and EL401-→secondary winding of the transformer 101 of the key telephone KT1→respective circuits in the key telephone KT1→secondary winding of the transformer T102 of the key telephone KT1→wiring cables EL501 and EL601→primary winding of the transformer T63 of the key telephone interface circuit L1→direct current source 62. It will be also clear that the electric power supply to the respective other key telephones KT2 to KT60 from each of the respective other key telephone interface circuits L2 to L60 are achieved exactly in the same manner as above.

RESPONSE TO CALLS FROM CO LINES

When an incoming call signal arrives the CO line interface circuit C1 from the central office through a pair of the CO lines, for example, CL101 and CL201, the signal is transmitted, while not shown, to the main controlling circuit CC through the lead wire XE1, and the incoming call is transmitted to the respective key telephone interface circuits, wiring cables and key telephones through the lead wire which is idle in the lead wires FL501 and FL601 to FL560 and FL660. As the handset of, for example, the key telephone KT1 is lifted, a talking circuit of the CO line interface circuit C1-switching matrix X1-lead wire FL101-key telephone interface circuit L1-wiring cable EL101-transmitter CMC and receiver RCV of the handset of the key telephone KT1 is formed and the talking becomes performable. For details of this operation, references shall be omitted since this is not a subject matter of the present invention.

As has been referred to in the foregoing, according to the present invention, each of the plurality of key telephones is connected through the six wiring cables to each of the plurality of key telephone interface circuits in the main equipment, the six wiring cables are divided into three pairs so that two pairs of the two-way voice frequency talking paths and a pair of the two-way digital data transmitting paths are formed and, in addition, the five switching matrixes are arranged within the main equipment so that the two pairs of the two-way voice frequency talking paths and a pair of the two-way digital data transmitting paths are properly connected, while the electric power feeding path is formed of one of the two pairs of the two-way voice frequency talking paths and the pair of the two-way digital data transmitting paths as the phantom lines. Therefore, the number of the wiring cables can a restricted to be minmum, an incoming intercom call in parallel with a handset call can be responded to in a hand-free manner, whereby the calling efficiency can be remarkably increased and such recent demand can be met without increasing costs.

Still according to the present invention, the five switching matrixes which are small in size are arranged within the main equipment, so that the respective operations corresponding to the respective functions can be properly divided so as to render an employment of a small number of small size and inexpensive microcomputers possible, whereby, as compared with an event in which large computers are employed with a small number of large switching matrixes, the manufacturing costs can be maintained lower while the functions of the key telephone system still can be well expanded.

Further according to the present invention, it is not necessary to arrange the DTMF sending circuit in each of the plurality of key telephones but it is only necessary to provide a few DTMF sending circuits in the main equipment, so that the key telephone system can be manufactured more economically and smaller in size. In addition, as the outgoing call to the CO lines from each of the key telephones is sent out through the main controlling circuit, such novel service functions as the restriction of toll calls, the last number redial and the like can be well achieved economically.

What is claimed is:

1. In a key telephone system comprising a main equipment connected to a plurality of central office lines and a plurality of key telephones connected to said main equipment, an arrangement in which said main equipment comprises:
   (a) a central-office-line interface circuit connected to said central office lines,
   (b) a key-telephone interface circuit connected to each of said plurality of key telephones,
   (c) a first switching matrix including columns, at least some of which are connected to said central-office-line interface circuit, and rows connected to respective said key-telephone interface circuits,
   (d) a second switching matrix including columns connected to said central-office-line interface circuit,
   (e) a dual-tone multifrequency sending circuit connected at the output end to rows of said second switching matrix,
   (f) an intercom trunk circuit connected to remaining columns of said first switching matrix,
   (g) a third switching matrix including rows connected to said columns of the first switching matrix which are connected to said intercom trunk circuit and columns connected to a tone source,
   (h) a fourth switching matrix including columns connected to said intercom trunk circuit and tone source and rows connected to said key-telephone interface circuits,
   (i) a fifth switching matrix inserted between respective ends of the key-telephone interface circuit connected respectively to the first switching matrix and to said fourth switching matrix, and
   (j) a main controlling means connected to the key-telephone interface circuit and dual-tone multifrequency sending circuit and to respective control leads of the first to fifth switching matrixes for controlling said switching matrixes to perform selected cross-point switching in response to a call request signal.

2. The system according to claim 1 wherein said intercom trunk circuit includes a two-wire-to-four-wire converting circuit which divides a two-way voice frequency talking path formed between the trunk circuit and said first switching matrix into a pair of one-way and reverse directional voice frequency talking paths, and said fourth switching matrix comprises a four-wire switching circuit.

3. The system according to claim 1 wherein said main equipment and respective said key telephones are mutually connected through a first pair of wiring cables connected through said key-telephone interface circuit to said first switching matrix and forming a first two-way voice frequency talking path, a second pair of wiring cables connected through the key-telephone interface circuit to said fourth switching matrix and forming a second two-way voice frequency talking path, and a third pair of wiring cables connected through the key-telephone interface circuit to said main controlling means and forming a two-way digital data transmitting path, said third pair of wiring cables further forming with said second pair of wiring cables an electric power feeding path to the respective key telephones.

4. The system according to claim 3 wherein said dual-tone multifrequency sending circuit includes a dual-tone signal oscillating circuit connected to said rows of said second switching matrix and a one-digit memory circuit inserted between said dual-tone multifrequency signal oscillating circuit and said main controlling means,
   said key-telephone interface circuit includes a first data transmitting and receiving circuit between the main controlling means and said third pair of wiring cables forming said two-way digital data transmitting circuit, and
   said key telephones include respectively a second data transmitting and receiving circuit connected to the third pair of wiring cables, a scanning circuit connected to said second data transmitting and receiving circuit, a push button pad to be scanned by said scanning circuit, a controlling circuit connected to said second data transmitting and receiving circuit and providing a command to the scanning circuit for scanning said push button pad, and a data memory circuit for temporarily storing a scanning result of the scanning circuit and providing thus stored result sequentially to the third pair of wiring cables in response to driving pulses from said main equipment.

5. The system according to claim 4 wherein said main equipment includes a plurality of dual-tone multifrequency sending circuits and said main controlling means is provided with a numerical value memory circuit for temporarily storing digital data representing the number of a subscriber being called that is transmitted from one of said key telephone through said data transmitting and receiving circuit in said key-telephone interface circuit, said main controlling means providing stored contents of digits of said numerical value memory circuit to one of said plurality of said dual-tone multifrequency sending circuits which is idle, said digits being provided to said sending circuit in the order in which they were stored in said memory circuit.

6. The system according to claim 5 wherein said central-office-line interface circuit includes a parallel circuit of a relay contact and a resistance inserted between a junction point of the central-office-line interface circuit with said first switching matrix and a junction point of the central-office-line interface circuit with said second switching matrix, and a relay connected to said main controlling means for opening said relay contact upon each arrival of a single digit dual-tone multifrequency signal through the second switching matrix, said single digit dual-tone multifrequency signal being transmitted to one of said key telephones through the first switching matrix and key telephone interface circuit as attenuated by said resistance.

* * * * *